US012589974B2

(12) United States Patent
Zellhofer et al.

(10) Patent No.: US 12,589,974 B2
(45) Date of Patent: Mar. 31, 2026

(54) COMPUTER-IMPLEMENTED METHOD FOR TRAINING A MACHINE LEARNING MODEL TO DETECT INSTALLATION ERRORS IN AN ELEVATOR, IN PARTICULAR AN ELEVATOR DOOR, A COMPUTER-IMPLEMENTED METHOD FOR CLASSIFYING INSTALLATION ERRORS AND A SYSTEM THEREOF

(71) Applicant: WITTUR HOLDING GmbH, Wiedenzhausen (DE)

(72) Inventors: Martin Zellhofer, Gresten (AT); Giuseppe De Francesco, Bergamo (IT)

(73) Assignee: WITTUR HOLDING GmbH, Wiedenzhausen (DE)

( * ) Notice: Subject to any disclaimer, the term of this patent is extended or adjusted under 35 U.S.C. 154(b) by 241 days.

(21) Appl. No.: 18/000,926

(22) PCT Filed: Jun. 17, 2022

(86) PCT No.: PCT/IB2022/055641
§ 371 (c)(1),
(2) Date: Dec. 6, 2022

(87) PCT Pub. No.: WO2023/062442
PCT Pub. Date: Apr. 20, 2023

(65) Prior Publication Data
US 2025/0002300 A1     Jan. 2, 2025

(30) Foreign Application Priority Data
Oct. 14, 2021     (IT) ......................... 102021000026375

(51) Int. Cl.
*B66B 19/00*        (2006.01)
*G06N 20/00*        (2019.01)

(52) U.S. Cl.
CPC ............. *B66B 19/00* (2013.01); *G06N 20/00* (2019.01)

(58) Field of Classification Search
CPC ........ B66B 19/00; B66B 5/0018; G06N 20/00
See application file for complete search history.

(56) References Cited

U.S. PATENT DOCUMENTS

| | | | | |
|---|---|---|---|---|
| 10,196,236 B2 * | 2/2019 | Sonnenmoser | ....... | B66B 5/0025 |
| 2020/0062542 A1 * | 2/2020 | Sudi | ...................... | B66B 1/3492 |
| 2024/0199374 A1 * | 6/2024 | Roivainen | .............. | G06N 20/00 |

FOREIGN PATENT DOCUMENTS

| | | | | | |
|---|---|---|---|---|---|
| CN | 110472563 A | * | 11/2019 | ............... | G06N 3/08 |
| CN | 111179964 A | * | 5/2020 | ............. | G10L 25/03 |

(Continued)

OTHER PUBLICATIONS

Machine Translation of Niu's reference (CN-112485001-A) (Year: 2021).*

(Continued)

*Primary Examiner* — Tarek Elarabi
(74) *Attorney, Agent, or Firm* — Paul G. Johnson; Maschoff Brennan

(57) ABSTRACT

A computer-implemented method for training a machine learning model to detect installation errors in an elevator, in particular an elevator door. The machine learning model being a combination of a Set Function model and a Fourier-Transform model. The method including arranging a plurality of sensors at the elevator and each sensor being configured to detect a physical parameter. The method also includes detecting values of the physical parameters by the sensors so as to obtain a dataset comprising at least one time series and obtaining a first input layer by extracting features from the dataset. The method also includes obtaining a second input layer by extracting features from the dataset, (Continued)

feeding the Set Function model with the first input layer, and feeding the Fourier-Transform model with the second input layer.

20 Claims, 5 Drawing Sheets

(56) References Cited

FOREIGN PATENT DOCUMENTS

| | | | | | |
|---|---|---|---|---|---|
| CN | 112485001 | A | * | 3/2021 | ......... G06F 18/2415 |
| EA | 028908 | B1 | | 1/2018 | |
| EP | 3459891 | A2 | | 3/2019 | |
| RU | 2 534 830 | C2 | | 12/2014 | |
| WO | 2018096582 | A1 | | 5/2018 | |

OTHER PUBLICATIONS

Machine Translation of Yang's reference (CN-111179964-A) (Year: 2020).*
Machine Translation of Zhao's reference (CN-110472563-A) (Year: 2019).*
International Search Report and Written Opinion as issued in connection with International Application No. PCT/IB2022/055641 dated Aug. 25, 2022.
Chai et al., "A Non-Intrusive Deep Learning Based Diagnosis System for Elevators", IEEE Access, vol. 9, Jan. 22, 2021.
Russian Search Report, as issued in connection with Russian Application No. 2022126104, dated Dec. 7, 2023, 2 pgs.

* cited by examiner

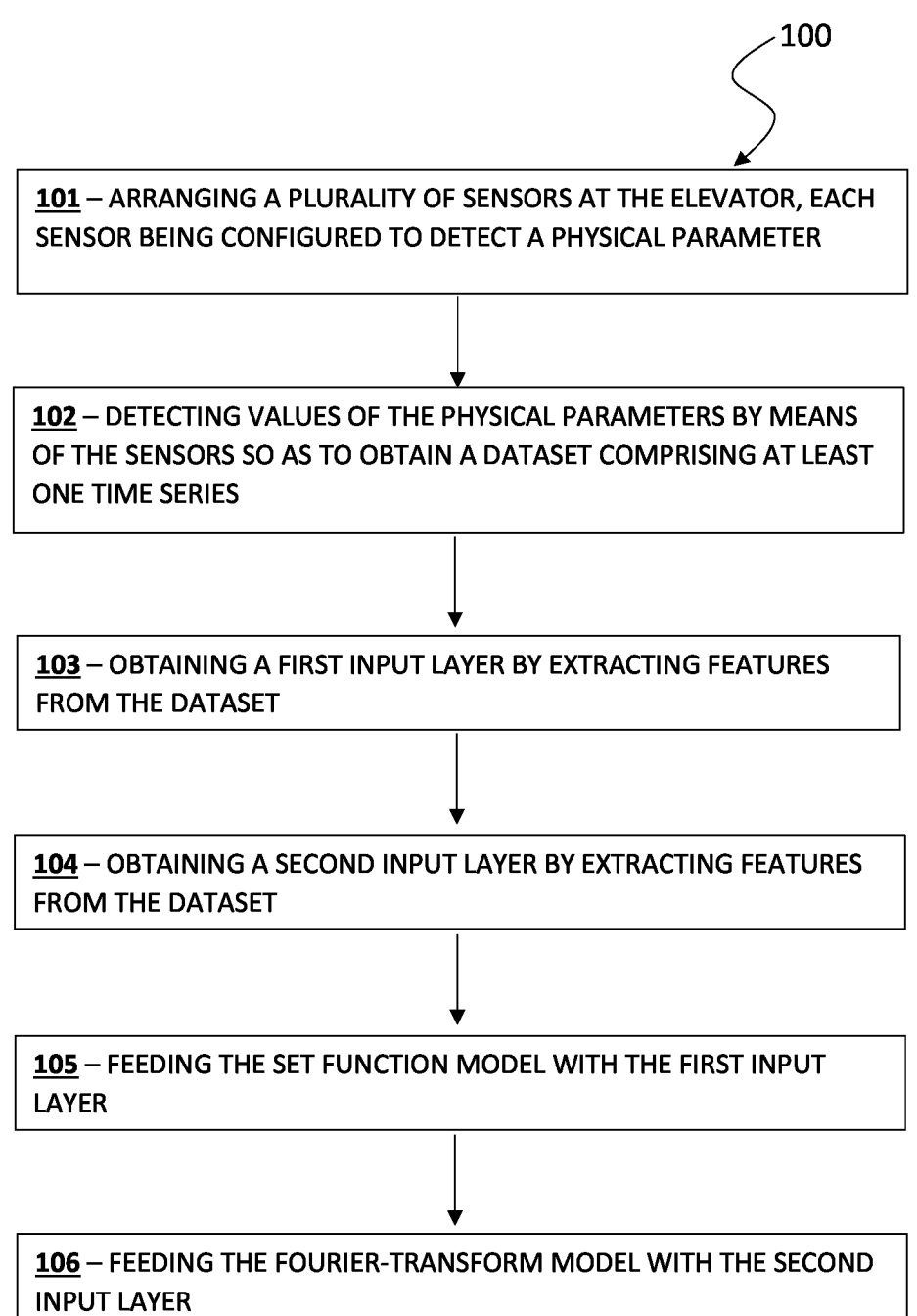

101 – ARRANGING A PLURALITY OF SENSORS AT THE ELEVATOR, EACH SENSOR BEING CONFIGURED TO DETECT A PHYSICAL PARAMETER

102 – DETECTING VALUES OF THE PHYSICAL PARAMETERS BY MEANS OF THE SENSORS SO AS TO OBTAIN A DATASET COMPRISING AT LEAST ONE TIME SERIES

103 – OBTAINING A FIRST INPUT LAYER BY EXTRACTING FEATURES FROM THE DATASET

104 – OBTAINING A SECOND INPUT LAYER BY EXTRACTING FEATURES FROM THE DATASET

105 – FEEDING THE SET FUNCTION MODEL WITH THE FIRST INPUT LAYER

106 – FEEDING THE FOURIER-TRANSFORM MODEL WITH THE SECOND INPUT LAYER

FIG. 4

COMPUTER-IMPLEMENTED METHOD FOR TRAINING A MACHINE LEARNING MODEL TO DETECT INSTALLATION ERRORS IN AN ELEVATOR, IN PARTICULAR AN ELEVATOR DOOR, A COMPUTER-IMPLEMENTED METHOD FOR CLASSIFYING INSTALLATION ERRORS AND A SYSTEM THEREOF

TECHNICAL FIELD

The present disclosure relates to a computer-implemented method for training a machine learning model to detect installation errors in an elevator, in particular an elevator door, as well as a computer-implemented method for classifying installation errors and a system thereof.

BACKGROUND

Monitoring systems of an elevator installation based on data detected from sensors scattered across the installation have already been proposed in the state of the art.

Document U.S. Pat. No. 10,196,236 B2, according to its abstract, proposes a monitoring system of an elevator installation and a method of operating the monitoring system for generating usage data of the elevator door. The monitoring system includes a sensor arranged in the elevator installation, wherein at least one physical parameter of the environment of the sensor can be detected by the sensor, and an evaluating unit, which determines an operating state of the elevator door by a course of the physical parameter over time.

Document US 2020/0062542 A1, according to its abstract, provides a method and system for determining elevator car locations, which are based on operating, by a processor, a machine room sensor to collect vibration data associated with one or more components in a machine room of an elevator system. The elevator system comprises an elevator car and a hoistway and the method analyses the vibration data to determine a position of the elevator car in the hoistway.

The above-mentioned solutions target predictive maintenance aspects but are still affected by poor installation quality. The data retrieved by the sensors are not sufficient to enhance installation quality since they are still indirect data, that means they are not directly connected to the door operator.

There is the need of reducing time and costs caused by faulty installations. In fact, elevator companies and multinationals have the major number of call backs within six months from the elevator release, mostly due to poor installation quality. The main component causing call back is usually the door.

It is apparent that installation quality is the key driver of customer satisfaction.

SUMMARY

In this context, the technical task at the basis of the present disclosure is to propose a computer-implemented method for training a machine learning model to detect installation errors in an elevator, in particular an elevator door, a computer-implemented method for classifying installation errors and a system thereof, which overcome the above-mentioned drawbacks of the prior art.

In particular, the object of the present disclosure is to propose a computer-implemented method for training a machine learning model to detect installation errors in an elevator, in particular an elevator door, a computer-implemented method for classifying installation errors and a system thereof, allowing to better detect faulty installations of elevator doors with respect to prior art solutions, thus increasing the quality of the installation process, in particular with respect to doors.

Another object of the present disclosure is to propose a computer-implemented method and a system for classifying installation errors in an elevator, in particular an elevator door, that allow to schedule maintenance operations and monitoring in a more efficient and easy way, thus reducing the time to certify a correct installation.

Another object of the present disclosure is to propose a computer-implemented method and a system for classifying installation errors in an elevator, in particular an elevator door, that reduce the numbers of knock-on effects due to poor installations.

The stated technical task and specified objects are substantially achieved by a computer-implemented method for training a machine learning model to detect installation errors in an elevator, in particular an elevator door, the machine learning model being a combination of a Set Function model and a Fourier-Transform model, the method comprising the steps of:

- arranging a plurality of sensors at the elevator, each sensor being configured to detect a physical parameter;
- detecting values of the physical parameters by means of the sensors so as to obtain a dataset comprising at least one time series;
- obtaining a first input layer by extracting features from the dataset;
- obtaining a second input layer by extracting features from the dataset;
- feeding the Set Function model with the first input layer;
- feeding the Fourier-Transform model with the second input layer.

According to one aspect of the disclosure, the dataset comprises a matrix of time series.

According to one aspect of the disclosure, the dataset further comprises one or more of static values or cyclic values.

According to one aspect of the disclosure, the dataset further comprises audio samples.

According to one aspect of the disclosure, the extracted features of the audio samples comprise audio spectrograms.

According to one aspect of the disclosure, the step of detecting values of the physical parameters by means of the sensors occurs with a different periodicity depending on the type of sensor and of physical parameter involved.

The stated technical task and specified objects are substantially achieved by a computer-implemented method for detecting installation errors in an elevator, in particular an elevator door, the method comprising the steps of:

- detecting a plurality of physical parameters by means of sensors arranged at the elevator;
- performing a first feature extraction and a second feature extraction from the detected physical parameters;
- feeding the first extracted features and the second extracted features to the machine learning model that was previously trained to detect installation errors.

The stated technical task and specified objects are substantially achieved by a system for detecting installation errors in an elevator, in particular an elevator door, comprising:

- a plurality of sensors arranged at the elevator and configured to detect physical parameters;

a first feature extraction unit and a second extraction unit configured to extract features from the detected physical parameters;

a machine learning model consisting in a combination of a Set Function model and a Fourier-Transform model configured to detect installation errors in response to the receipt of the extracted features coming from the first feature extraction unit and from the second feature extraction unit, the machine learning model having been previously trained to detect installation errors.

According to one aspect of the disclosure, the sensors are chosen among the following: position sensor, speed sensor, microphone.

BRIEF DESCRIPTION OF DRAWINGS

Additional features and advantages of the present disclosure will be more apparent from the approximate, and hence non-restrictive description of a preferred but non-exclusive embodiment of a computer-implemented method for training a machine learning model to detect installation errors in an elevator, in particular an elevator door, a computer-implemented method for classifying installation errors and a system thereof, as illustrated in the appended figures in which:

FIG. 4 illustrates the flow diagram of a computer-implemented method for training a machine learning model to detect installation errors in an elevator, in particular an elevator door, according to the present disclosure;

DETAILED DESCRIPTION

Figure 1:
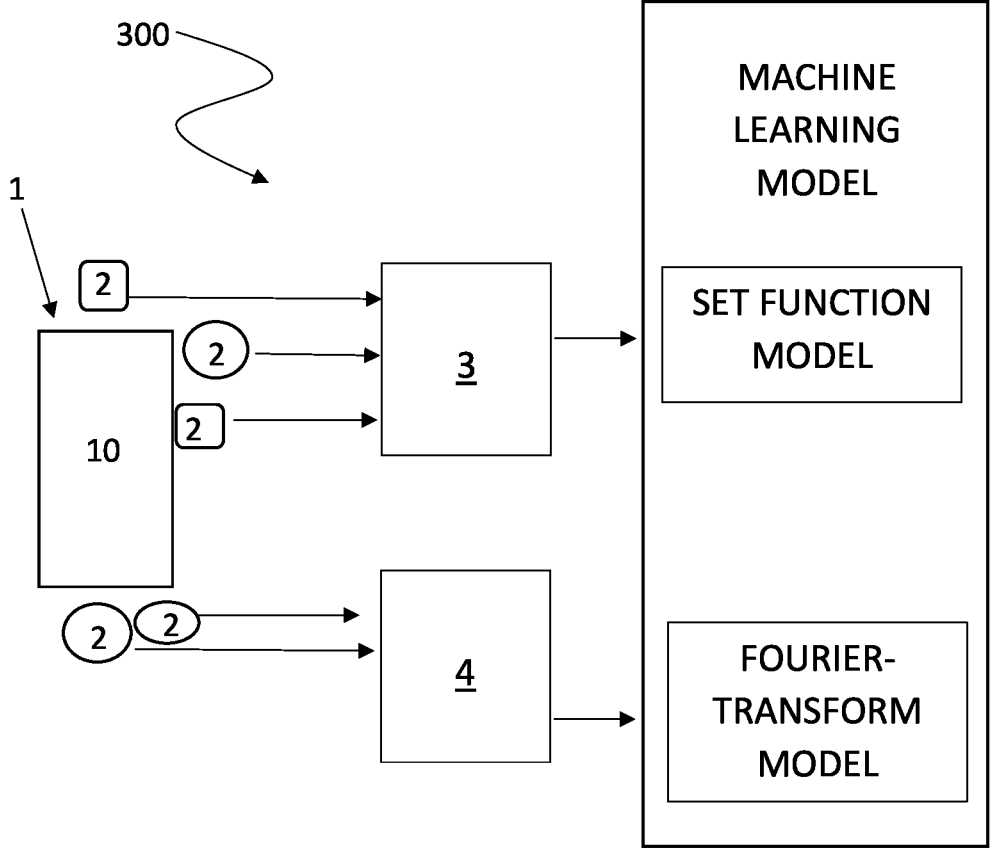
FIG. 1 illustrates a system for classifying installation errors in an elevator, in particular an elevator door, according to the present disclosure.

One application of the disclosure is the installation control of elevator doors, in particular elevator landing doors and car doors.

The disclosure finds application also in predictive maintenance and remote monitoring of elevator doors.

Another application of the disclosure relates to elevator drive means, in particular motor, brake equipment and encoder.

Another application of the disclosure is in safeties, for example overspeed governor, safety gear, governor tension rope and shave.

There is also envisaged the control of accelerometers, load weighing transducers and lift controller and door safety switches.

In general, the proposed disclosure finds application to any component of an elevator.

With reference to the figures, number 100 identifies a computer-implemented method for training a machine learning model to detect installation errors in an elevator, in particular an elevator door.

The method may be applied to an elevator landing door or to an elevator car door.

There are various installation errors in an elevator, that may be detected.

According to a preferred embodiment, the method 100 can identify two categories of installation errors: binary failures and failures measured in percent.

A binary failure is indicated as "present" or "not present".

In the binary failures there are comprised closing device failure, condition of pulley touching the belt, etc.

A failure measured in precent is rated in a range.

In the failures measured in percent, there are listed: counter rollers installation, horizonal misalignment of the elevator landing/car door, vertical misalignment of the elevator landing/car door, belt tension, zero position, etc.

As illustrated in FIG. 4, the method 100 starts with a step of arranging a plurality of sensors 2 at the elevator (step 101).

The method 100 is in fact based on the measurements of physical parameters detected by the sensors 2 arranged at different positions of an elevator 1 (step 102), for example they are operatively active on a door 10 of the elevator 1.

Sensors 2 may be of different types and numbers. For example, there could be a door speed sensor, a door position sensor, a microphone, Preferably, the measurements are collected for a high number of door cycles, for example 20,000.

The frequency of collection may vary depending on the type of sensor.

In particular, some of the sensors detect values which are static, i.e. they do not change during the cycle. For example, static values relate to the characteristics of the door, like the width, the material, the type of motor, etc.

Other sensors detect values which may have a cyclic change, that means they periodically vary, i.e. temperature, friction, vibration, etc.

Other sensors detect audio samples. These may relate to sound of the moving door, clicking relays, etc.

Other sensors detect values which have a higher frequency variation within a door cycle, thus originating a time series.

All the values detected by the sensors form a database, which comprises at least one time series.

For example, a dataset used for the training method 10 comprises:
a list of static values;
a list of cyclic values;
a list of audio samples;
a matrix of time series.
Then, the method 100 comprises:
a step of obtaining a first input layer for the machine learning model by extracting features from the dataset (step 103)
a step of obtaining a second input layer for the machine learning model by extracting features from the dataset (step 104).

Features or labels are chosen depending on the installation errors that the model shall learn to recognize.

In particular, the features extracted to generate the first input layer relate to time series of the dataset.

The features extracted to generate the second input layer relate to the other fields of the dataset (static values, cyclic values, audio samples).

For audio samples, the feature extraction is carried out transforming the audio samples into visual features representation like audio spectrograms.

A first approach for feature extraction from audio samples is using autoencoders to learn a latent feature vector out of the image by reconstructing the image itself (unsupervised learning).

A second approach is to classify the images with the collected labels via a convolutional neural network and fix one of the last hidden layers to act as additional feature vector for the classification with both the models. For both models, these features would be added at the concatenation step.

The extracted features are then fed to the machine learning model following two different branches at the same level.

In fact, the machine learning model is composed by two models along parallel branches:

a first model, that is a Set Function model a second model, that is a Fourier-Transform model The Set Function model is fed with the first input layer (step 105).

The Fourier-Transform model is fed with the second input layer (step 106).

With reference to the first model, that is the Set Function model, the first input layer is obtained after a pre-processing including a normalization step.

Set Functions for Time Series (shortly "SeFT") classification is a state-of-the-art method for time series classification and regression.

It operates on the raw (normalized) time series as a set and is able to handle additional features which occur once per time series.

In principle the time information is encoded via Positional Encoding and (possibly multiple) weighted means of the measurements are calculated. The weights are trained via the Attention mechanism.

After these steps, one gets a fixed sized vector which describes the time series in a lower dimension.

This vector is concatenated with the other static, cyclic, and possibly audio feature vectors to form the input to classifiers/regressors like neural networks.

A point to have in mind as well is the objective function, which is designed to handle binary targets as well as bounded regression targets. In order to fill the purpose, we have the binary values in $\{0, 1\}$ and normalize the regression values from $[-100\%, +100\%]$ to $[-1, 1]$.

SeFT training is carried out by applying binary cross-entropy.

Training time is about one day with circa 20,000 door cycles used for training.

Figure 2:
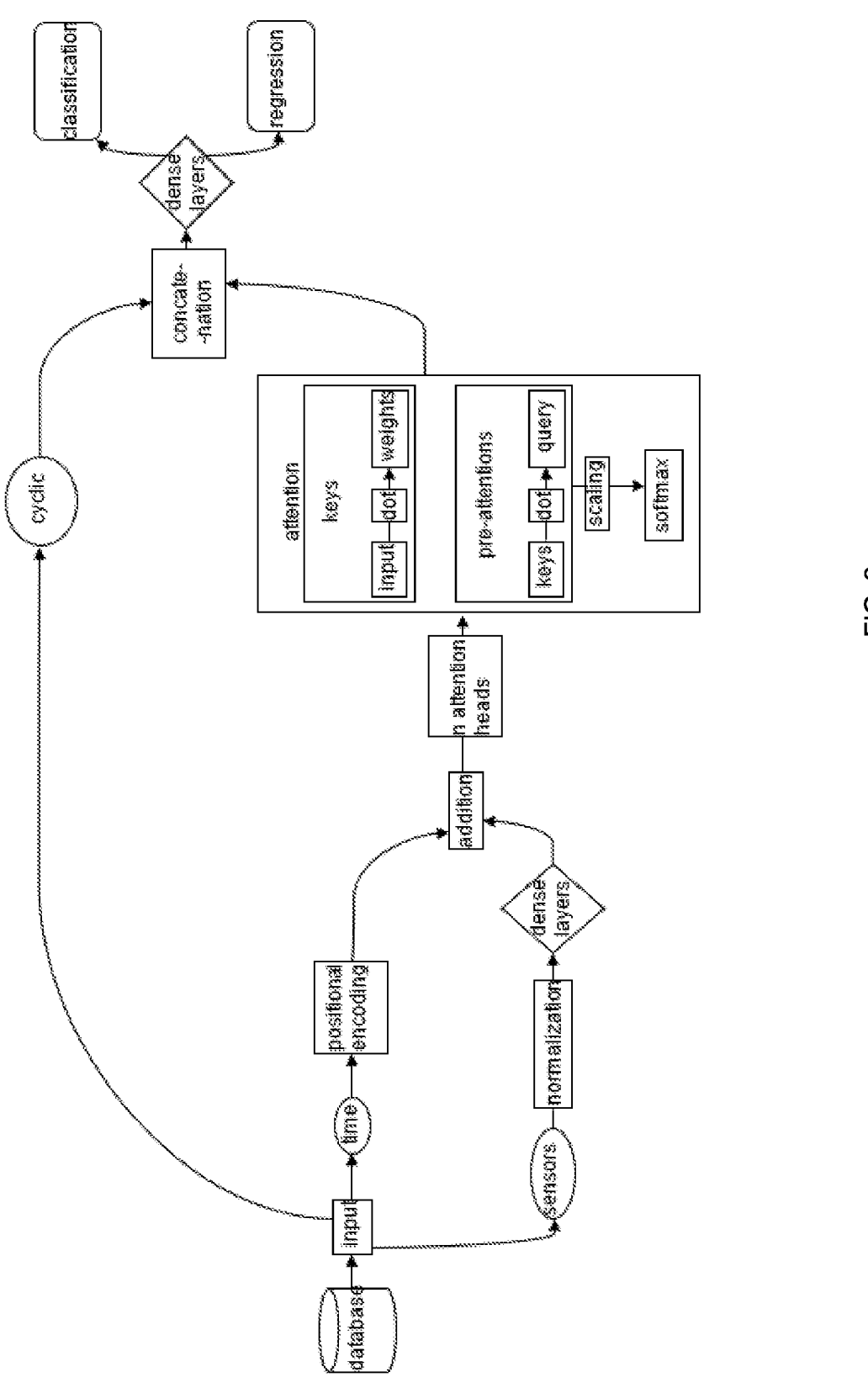
FIG. 2 is a schematic view of the Set Functions used in a computer-implemented method for classifying installation errors in an elevator, in particular an elevator door, according to the present disclosure.

A schematic view of the Set Functions applied in the method 100 proposed herewith is illustrated in FIG. 2.

With reference to the second model, that is the Fourier-Transform model, the second input layer is obtained after a pre-processing comprising interpolating the values to get an evenly sampled time series and converting the signal into a phase diagram and normalizing the static features for the classifier.

Fourier transformation converts a time series signal into its frequency parts. For this a door speed-door position phase diagram is generated and altered to form a sinusoid like curve to be used in Fourier transformation.

Per sensor, it is extracted the frequency with the maximum coefficient and the respective coefficient as a two-element vector. All these vectors and the other cyclic features are concatenated to form the feature column which is fed to the Fourier-Transform model.

Preferably, it is used a so-called "XGBoost" that is an implementation of gradient boosted decision trees designed for speed and performance. A decoupled implementation of multiple XGBoost classifiers is used where the hinge loss is used as the loss function for binary classification and squared loss for the regression.

An irregularly sampled timeseries X is interpolated to obtain p equally spaced values.

Fourier-Transform training is carried out by applying hinge loss for classification targets.

Training time is about 3 minutes with circa 20,000 door cycles used for training.

Figure 3:
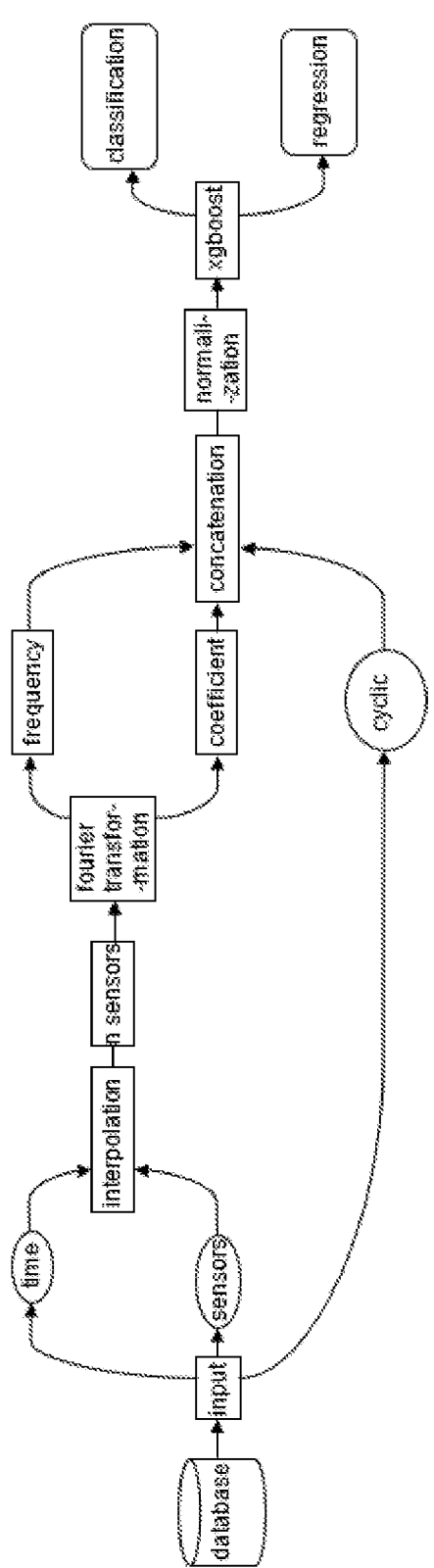
FIG. 3 is a schematic view of the FFT model used in a computer-implemented method for classifying installation errors in an elevator, in particular an elevator door, according to the present disclosure.

A schematic view of the FFT model applied in the method 100 proposed herewith is illustrated in FIG. 3.

Figure 5:
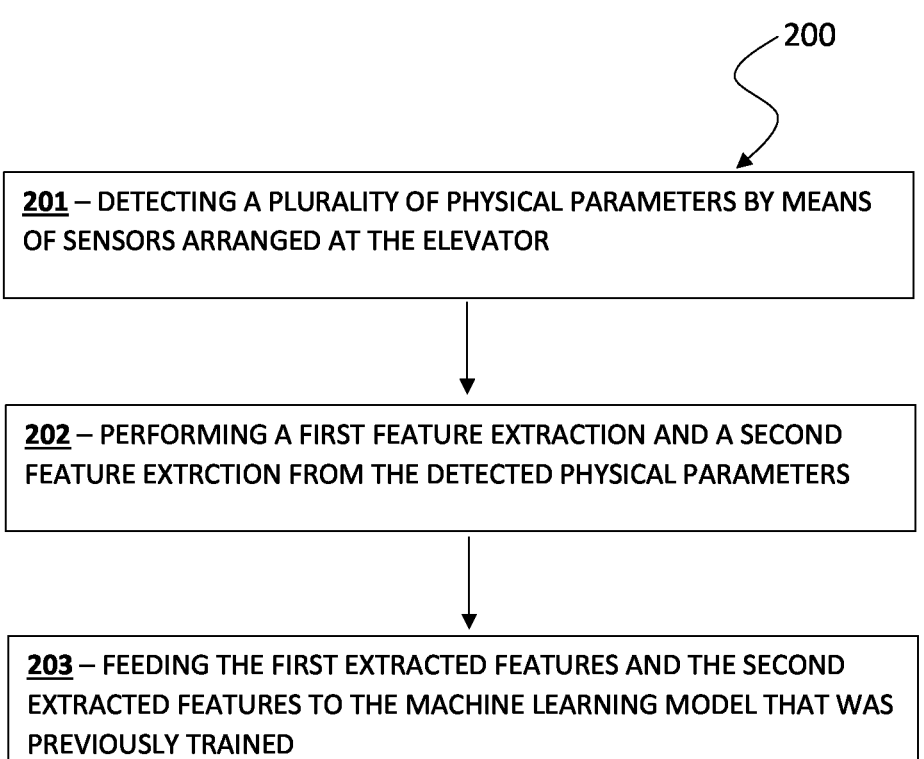
FIG. 5 illustrates the flow diagram of a computer-implemented method for classifying installation errors in an elevator, in particular an elevator door, according to the present disclosure.

With reference to FIG. 5, number 200 identifies a method for detecting installation errors in an elevator, in particular an elevator door. The method 200 comprises the following steps, illustrated in the flow diagram of FIG. 5:

detecting a plurality of physical parameters by means of sensors arranged at the elevator (step 201);

performing a first feature extraction and a second feature extraction from the detected physical parameters (step 202);

feeding the first extracted features and the second extracted features to the machine learning model that was already trained to detect installation errors (step 203).

With reference to FIG. 1, number 300 identifies a system for detecting installation errors in an elevator 1, in particular an elevator door 10, comprising:

a plurality of sensors 2 arranged at the elevator 1 and configured to detect physical parameters;

a first feature extraction unit 3 and a second feature extraction unit 4 configured to extract features from the detected physical parameters;

a machine learning model ML consisting in a combination of a Set Function model, SF, and a Fourier-Transform model, FT, configured to detect installation errors in response to the receipt of the extracted features coming from the first feature extraction unit 3 and from the second feature extraction unit 4, where the machine learning model ML has been trained in accordance with the method described above.

According to one aspect of the disclosure, the detected physical parameters may be pre-processed before being fed to the first feature extraction unit 3 and to the second feature extraction unit 4.

According to one aspect of the disclosure, the output of the first extraction unit 3 and of the second extraction unit 4 may be processed before being fed to the machine learning model ML.

The characteristics and the advantages of a computer-implemented method for training a machine learning model to detect installation errors in an elevator, in particular an elevator door, as well as a computer-implemented method for classifying installation errors and a system thereof, according to the present disclosure, are clear, as are the advantages.

In particular, the proposed method allows to increase the quality of the installation process, in particular with respect to elevator doors, thanks to the huge amount of data retrieved from the sensors directly installed in proximity of the door and to the specific machine learning model chosen.

This reduces the installation times and costs and allows to schedule maintenance operations and monitoring, also reducing the time to obtain quality certification.

The proposed disclosure is also applicable to other components of the elevator.

The present disclosure may achieve important advantages. For example, the disclosure may allow improving the stiffness of the photovoltaic system and exerting a more effective resistance to the overturning action exerted by the wind. It also makes it possible to extend the life of the system by reducing maintenance interventions.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the present invention.

The invention claimed is:

1. A computer-implemented method for training a machine learning model to detect installation errors in an elevator, the machine learning model being a combination of a Set Function model and a Fourier-Transform model, the method comprising:
    arranging a plurality of sensors at the elevator, each sensor being configured to detect a physical parameter;
    detecting values of the physical parameters by said sensors to obtain a dataset comprising at least one time series;
    obtaining a first input layer by extracting features from the dataset;
    obtaining a second input layer by extracting features from the dataset;
    feeding the Set Function model with the first input layer; and
    feeding the Fourier-Transform model with the second input layer, wherein the feeding the Set Function model and the feeding the Fourier-Transform model results in training the machine learning model that detects installation errors in the elevator.

2. The method according to claim 1, wherein the dataset comprises a matrix of time series.

3. The method according to claim 1, wherein the dataset further comprises one or more of static values or cyclic values.

4. The method according to claim 1, wherein the dataset further comprises audio samples.

5. The method according to claim 4, wherein features extracted from the audio samples in the dataset comprise audio spectrograms.

6. The method according to claim 1, wherein the step of detecting values of the physical parameters by said sensors occurs with a different periodicity depending on which of the plurality of sensors is used and the physical parameter involved.

7. A computer-implemented method for detecting installation errors in an elevator, said method comprising:
    detecting a plurality of physical parameters by one or more sensors arranged at the elevator;
    performing a first feature extraction and a second feature extraction from the detected physical parameters;
    feeding the first extracted features and the second extracted features to a machine learning model that is trained that includes a combination of a Set Function model and a Fourier-Transform model to detect installation errors, wherein the machine learning model training comprising:

obtaining a dataset including at least one time series from values of second physical parameters;

obtaining a first input layer and a second input layer by extracting features from the dataset; and feeding the Set Function model with the first input layer and the Fourier-Transform model with the second input layer.

8. A software product for loading into a memory of an electronic device, said software product comprising instructions which, when run by the electronic device, cause or direct execution of the method according to claim 7.

9. The method according to claim 7, wherein the dataset comprises a matrix of time series.

10. The method according to claim 7, wherein the dataset further comprises one or more of static values or cyclic values.

11. The method according to claim 7, wherein the dataset further comprises audio samples.

12. The method according to claim 11, wherein features extracted from the audio samples in the dataset comprise audio spectrograms.

13. The method according to claim 7, wherein the values of the second physical parameters are obtained for inclusion in the dataset at a varying periodicity.

14. A system for detecting installation errors in an elevator, the system comprising:

a plurality of sensors arranged at the elevator and configured to detect physical parameters; and a device that includes instructions that when executed are configured to cause the device to perform operations, the operations including:

extracting features from the detected physical parameters; and detecting installation errors of the elevator by applying the extracted features to a machine learning model that includes a combination of a Set Function model and a Fourier-Transform model wherein training the machine learning model to detect installation errors in the elevator comprising:

obtaining a dataset including at least one time series from values of second physical parameters;

obtaining a first input layer and a second input layer by extracting features from the dataset; and feeding the Set Function model with the first input layer and the Fourier-Transform model with the second input layer.

15. The system according to claim 14, wherein the sensors are chosen from among the following sensors: a position sensor, a speed sensor, a microphone.

16. The system according to claim 14, wherein the dataset comprises a matrix of time series.

17. The system according to claim 14, wherein the dataset further comprises one or more of static values or cyclic values.

18. The system according to claim 14, wherein the dataset further comprises audio samples.

19. The system according to claim 18, wherein features extracted from the audio samples in the dataset comprise audio spectrograms.

20. The system according to claim 14, wherein the values of the second physical parameters are obtained for inclusion in the dataset at a varying periodicity.

* * * * *